Aug. 20, 1929.   T. STEIN   1,725,679
THROTTLING ARRANGEMENT FOR CONDUITS
Filed Feb. 17, 1926
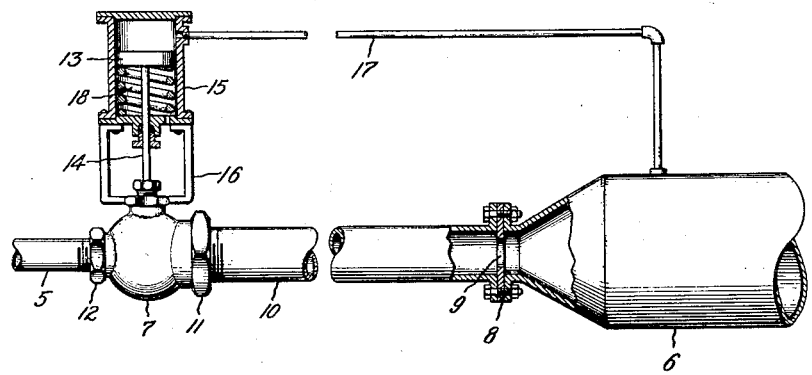
Inventor:
Theodor Stein,
by
His Attorney.

Patented Aug. 20, 1929.

1,725,679

UNITED STATES PATENT OFFICE.

THEODOR STEIN, OF FRIEDENAU, GERMANY, ASSIGNOR TO GENERAL ELECTRIC COMPANY, A CORPORATION OF NEW YORK.

THROTTLING ARRANGEMENT FOR CONDUITS.

Application filed February 17, 1926, Serial No. 88,902, and in Germany March 13, 1925.

The present invention relates to a throttling arrangement for conduits conveying fluids under pressure, and more particularly it relates to a throttling arrangement in a conduit providing a pressure-reducing connection between two points of pressure difference in a fluid-conduit system or between two fluid conduits or conduit systems wherein differing fluid pressures exist.

In the problem of conveying a fluid from one point of higher pressure to another point of lower pressure, relatively great pressure reductions have frequently to be made. The ordinary throttle valve usually employed for this purpose heretofore, particularly in connection with conduits conveying steam, which may be taken as a common and well known example, provides a restricted passage of variable cross-section connected in the conduit to be throttled. According to the opening of the throttle valve, a greater or lesser quantity of steam is allowed to pass between the higher and lower pressure sides of the valve. This arrangement admits of automatic control in response to either the higher or the lower pressure to maintain either the one or the other constant in any suitable and well known manner.

With this arrangement, the cross-sectional areas of the inlet and outlet of the valve, together with those of the inlet and outlet conduits respectively connected therewith, must be so related that on each side of the throttle valve a determined maximum permissible steam velocity is set up when the maximum desired quantity of steam is passing through the throttle valve and connected conduits, if the arrangement is to be fully and efficiently utilized. For example, if live steam at 300 pounds pressure is to be reduced to 30 pounds pressure while flowing at a certain desired velocity, the specific volume of the steam after its expansion in the throttle valve will be approximately ten times as great, so that the outlet of the valve and conduit connected therewith must be given a cross-sectional area approximately ten times that of the inlet and inlet conduit, if the latter is dimensioned to the extreme limit and the arrangement is to function efficiently.

This arrangement thus requires a valve or similar throttling means of special design and has the disadvantage that for different ranges of efficient pressure reduction, a large variety of valves is necessary to meet every desired condition of operation, and the valves and valve fittings required, particularly for effecting the greater reductions of pressure, are expensive because of their special design.

A further disadvantage lies in the fact that the low pressure or outlet conduit must often be of considerable length and because of its size correspondingly relatively costly. Additional fittings in large conduits, such as shut-off valves, elbows, tees and couplings, are also relatively costly because of their size.

It is the object of this invention to provide an improved and efficient throttling arrangement for conduits which obviates the above and other disadvantages common to throttling arrangements used heretofore and which at the same time admits of automatic as well as manual control at any convenient location.

For a further consideration of what is believed to be novel, attention is now directed to the accompanying drawing, the description thereof and the appended claims.

In the drawing, the figure is a view, partly in section, of a conduit provided with a throttling arrangement embodying the invention.

Referring to the drawing, 5 is a high pressure section and 6 is a low pressure section of a conduit conveying a fluid, the fluid flow being from the high pressure to the low pressure section. Conduit sections 5 and 6 may be considered to represent any higher and lower pressure conduits or conduit systems which it is desired to connect by a pressure-reducing arrangement, and in the present example may be considered to carry steam, although the invention is not limited to the control or reduction of steam pressure.

In the conduit adjacent the high pressure section is located a throttle valve 7 which may be of any suitable construction and which provides a restricted passage of variable cross-section in the conduit. Adjacent the low pressure section is provided a second restricted passage of constant cross-section. This last is provided by any suitable means, such as a baffle plate 8 having a control orifice opening 9. The baffle plate is clamped between the flanged ends of the low pressure conduit 6 and a connecting conduit section 10, which at its opposite end is connected to the outlet end of throttle valve 7.

The cross-sectional area of the low pressure section 6, with respect to that of the high pressure supply section 5, is such that the maximum desired velocity of flow is permitted in both sections. That is, assuming a pressure of 300 pounds in supply section 5 and a resulting pressure of 30 pounds in the low pressure section 6, the latter is provided with a cross-sectional area of approximately ten times that of section 5 for maximum use of the conduit connection.

The present arrangement is such that part of the pressure drop is taken in the throttle valve 7 and part by the baffle plate or fixed throttle 8. An intermediate pressure is thus set up in the connecting conduit section 10. The baffle plate orifice 9 is of such cross-sectional area that this intermediate pressure is only slightly lower than that in supply section 5, for example about 240 pounds pressure, when the full velocity of flow is admitted through the conduit. This permits the connecting conduit section 10, which may be and often is of considerable length, to be economically provided; that is, it may be a pipe of relatively small diameter while providing for the throttling control by valve 7 adjacent the suppy section 5. Furthermore the outlet connection for the throttle valve represented by a flange 11 need be only large enough to connect with conduit 10 and only slightly larger than the inlet connection with the supply conduit section 5 as indicated by a flange 12.

With the usual throttling arrangement connecting conduit 10 would be of the same cross-sectional area as the low pressure section 6 necessitating a valve 7 with an enlarged outlet flange 11, that is a valve of special construction.

With the present arrangement a throttle valve and connecting conduit of the desired size may be installed and the correct pressure in the connecting conduit for maximum velocity of flow established by inserting a baffle plate having the correct size orifice opening adjacent the low pressure section. This arrangement operates to provide for the desired maximum velocity of flow under all conditions as illustrated by the following example:—

Assuming that the quantity of steam passing through the throttling conduit arrangement falls below the maximum, for example to half, then the pressure in front of, or on the higher pressure side of the baffle plate will fall to one-half its former value, that is, to 120 pounds, assuming the former pressure to have been 240 pounds as given hereinbefore. The specific volume of the steam in connecting conduit 10 will then be doubled. Half the quantity of steam at double the specific volume has again the original steam velocity as is well known. Thus under this and all other conditions of flow, the conduit connection is fully utilized, and without requiring a connecting conduit section of excessive size or a throttle valve of special construction, since both the throttle valve outlet flange and the connecting conduit section are dimensioned for only a slight increase of volume corresponding to a pressure of 240 pounds, in the present example, instead of for a volume corresponding to a pressure of 30 pounds as would be necessary with throttling arrangements hitherto known.

In certain applications of the throttling arrangement provided by the present invention, it is desirable to provide the connecting conduit section 10 with the same diameter or cross-sectional area as the supply conduit section 5 for the purpose of utilizing as the adjustable throttle means, an easily manufactured valve having equal inlet and discharge openings or connecting flanges. To provide the same pressure reduction at the desired velocity of flow, it is necessary only to change the cross-section of the fixed throttle means. In the present example this simply means changing baffle plate 8 to provide an orifice opening of the correct size. Valve 7 may then have equal inlet and outlet openings and likewise connecting conduit section 10 may have the same cross-sectional area as supply section 5.

The use of the throttling flange as shown or equivalent means is very advantageous, particularly in reducing higher pressures, since the cross-sectional area or diameter of the throttling valve or other equivalent variable throttling means may be made relatively small. For example, assuming pipe conduits as shown, and the pressures as sumed hereinbefore of 300 pounds in the supply conduit section and 30 pounds in the low pressure conduit section, throttle valve 7 and conduit section 10 may be dimensioned approximately ten times smaller in cross-sectional area or $\sqrt{10}$ times smaller in diameter than the low pressure conduit.

In the case of even greater pressure reductions, for example, 1500 pounds to 30 pounds, the arrangement presents even more favorable advantages, since the throttle valve may be kept fifty times smaller in cross-section than the low pressure section or $\sqrt{50}$ or seven times smaller in diameter, which in view of the questions of strength and packing, is important in connection with such high pressures.

From the foregoing description, it will be seen that this pressure reducing or throttling arrangement may be used in connecting two widely separated conduits or conduit systems between which a wide pressure difference exists, without involving the use of a large and expensive connecting conduit and that the variable throttling means in the arrangement may be placed in any convenient location without involving large and complicated conduits or piping, since the conduits or piping, leading to and from it, may be kept relatively small by the use of a throttling flange or similar means connected in accordance with the invention.

In addition to the above advantages, the throttling arrangement embodying the invention is adapted to automatic control, as provided in connection with pressure reducing means heretofore known. To illustrate the adaptability of the arrangement to such control and by way of example, a simple pressure regulator means is shown in connection with the present embodiment. This comprises a piston 13 carried by the upper end of the throttle valve stem 14 which operates in a cylinder 15 mounted on the valve body by a suitable bracket 16. Controlling pressure from any suitable source such as from the low pressure conduit 10 is admitted to the upper side of the piston through a pressure pipe 17. The pressure operates to move the piston downwardly to close the throttle valve against the action of a coiled spring 18 contained in the cylinder beneath the piston. The spring is of such strength that it balances the pressure acting on the piston when the valve is opened sufficiently to provide the desired pressure in conduit 6. Any increase or decrease in the pressure then causes a corresponding unbalance in one direction or the other and a corresponding movement of the piston and valve to effect a correction of the unbalance and to restore the pressure to its normal value. As such regulators are old and well known in themselves, further description is believed to be unnecessary.

While the invention has been described in a simple embodiment in its application to the throttling control of steam, it should be understood that it is not limited thereto, but may be applied to conduits conveying other fluids as well and may be carried out by other means.

What I claim as new and desire to secure by Letters Patent of the United States, is,—

1. The combination of a high pressure conduit and a remotely located low pressure conduit, said low pressure conduit being adapted to convey a fluid of relatively low pressure at the same rate of flow as the high pressure conduit and being therefore relatively large in cross section compared with the high pressure conduit, of means for supplying fluid at a reduced and controlled pressure from the high pressure conduit to the low pressure conduit, said means comprising a connecting conduit extending from said low pressure conduit to said high pressure conduit, means providing a restricted passage of variable cross-section between the high pressure conduit and said connecting conduit, said connecting conduit being larger in cross-section than the high pressure conduit but relatively small in cross-section as compared with the low pressure conduit and means providing a restricted passage of fixed cross-section between the connecting conduit and the low pressure conduit.

2. The combination with a conduit of relatively large cross section adapted to convey a fluid of relatively low pressure and a remote source of fluid pressure supply comprising a conduit of relatively small cross section adapted to convey a fluid at a relatively high pressure, of means for connecting said conduits and remotely controlling and varying the pressure in the low pressure conduit at said fluid source, said means comprising a third conduit of smaller cross section than that of the low pressure conduit extending between and connecting the first and second-named conduits, a throttle valve at the high pressure source interposed between the high pressure conduit and the third-named conduit, means responsive to the pressure in one of the conduits for controlling said throttle valve, and an orifice interposed between said third-named conduit and the low pressure conduit, at said low pressure conduit.

3. The combination with a pair of conduits adapted to convey fluid at the same rate of flow and at widely differing higher and lower pressures, of a connecting conduit therefor adapted to convey fluid between said conduits at the same rate of flow and at intermediate pressure, a throttle valve interposed between the higher pressure conduit and the connecting conduit whereby said intermediate pressure is adjustable, means responsive to the pressure in one of the conduits for controlling said throttle valve, and a fixed orifice interposed between the connecting conduit and the lower pressure conduit for establishing the lower pressure in the latter conduit.

In witness whereof, I have hereunto set my hand this 30th day of January, 1926.

THEODOR STEIN.